(12) United States Patent
Alam et al.

(10) Patent No.: US 12,074,806 B2
(45) Date of Patent: Aug. 27, 2024

(54) NONDOMINANT RESOURCE MANAGEMENT FOR EDGE MULTI-TENANT APPLICATIONS

(71) Applicant: Intel Corporation, Santa Clara, CA (US)

(72) Inventors: S M Iftekharul Alam, Hillsboro, OR (US); Satish Chandra Jha, Portland, OR (US); Ned M. Smith, Beaverton, OR (US); Vesh Raj Sharma Banjade, Portland, OR (US); Kshitij Arun Doshi, Tempe, AZ (US); Francesc Guim Bernat, Barcelona (ES); Arvind Merwaday, Beaverton, OR (US); Kuilin Clark Chen, Portland, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/711,921

(22) Filed: Apr. 1, 2022

(65) Prior Publication Data

US 2022/0231964 A1 Jul. 21, 2022

(51) Int. Cl.
*H04L 47/72* (2022.01)
*H04L 47/74* (2022.01)

(52) U.S. Cl.
CPC .............. *H04L 47/72* (2013.01); *H04L 47/74* (2013.01)

(58) Field of Classification Search
CPC .................................. H04L 47/72; H04L 47/74
See application file for complete search history.

(56) References Cited

U.S. PATENT DOCUMENTS

| | | | | |
|---|---|---|---|---|
| 9,471,391 | B1 * | 10/2016 | Abramson | G06F 16/285 |
| 10,353,745 | B1 * | 7/2019 | Sait | G06F 9/5077 |
| 2013/0339472 | A1 * | 12/2013 | Ruellan | H04L 67/568 |
| | | | | 709/214 |
| 2017/0093968 | A1 * | 3/2017 | Chin | H04L 47/70 |

(Continued)

OTHER PUBLICATIONS

Hamzeh et al.; "FFMRA: A Fully Fair Multi-Resource Allocation Algorithm in Cloud Environments"; 2019; 2019 IEEE SmartWorld (Year: 2019).*

*Primary Examiner* — Glenton B Burgess
*Assistant Examiner* — Jihad K Boustany
(74) *Attorney, Agent, or Firm* — Schwegman Lundberg & Woessner, P.A.

(57) ABSTRACT

A resource management framework may be used to improve performance of dominant and non-dominant resources for edge multi-tenant applications. The resource management framework may include an admission control mechanism, which may be used to balance disproportionate resource allocations by controlling allocation of unconstrained resources proportional to the requested dominant resources based on resource availability. The admission control mechanism may provide ongoing monitoring of dominant and non-dominant resource utilization, such as using a hybrid centralized-distributed telemetry collection approach. The resource management framework may also include a lightweight resource monitoring and policy enforcement mechanism on distributed networking elements to reduce or eliminate the exploitations of non-dominant resources.

22 Claims, 12 Drawing Sheets

(56) References Cited

U.S. PATENT DOCUMENTS

2017/0264493 A1* 9/2017 Cencini ............... H04L 67/1008
2020/0364086 A1* 11/2020 Gavali ................ G06F 11/3414
2021/0117244 A1* 4/2021 Herdrich ............... G06F 9/5027
2021/0294661 A1* 9/2021 Turner ................... G06Q 30/08
2023/0083701 A1* 3/2023 Wang .................. G06F 11/3428

* cited by examiner

NONDOMINANT RESOURCE MANAGEMENT FOR EDGE MULTI-TENANT APPLICATIONS

TECHNICAL FIELD

Embodiments described herein relate to edge computing resource management.

BACKGROUND

In a multi-tenant data center or converged edge computing environment, a computing tenant may submit a computing job request to be executed by remote processing devices, such as cloud computing devices or edge computing devices (e.g., processing devices at the edge of a computing network). The computing job request may be submitted to a Resource Management and Orchestration (RMO) framework. The job request may include details of tasks and information about the associated resource requirements, such as types and number or amount of computing resources for completing the job request.

The resource requirements within the job request may be used to identify one or more dominant resources or non-dominant resources required to complete the job request. The dominant resources (e.g., constrained resources) may include one or more resources that constrain the operation of the job task, such as by rate-limiting the completion of the job task. In an example, a job task may require operations on a central processing unit (CPU) and on a graphical processing unit (GPU), and the CPU may be considered the dominant resource if the job task completion time is more affected by the CPU performance, such as when CPU operations require substantially more time to complete than GPU operations. Resources that do not constrain the operation of the job task may be considered non-dominant (e.g., unconstrained) resources. The dominant or non-dominant resources may include one or more of CPUs, GPUs, memory resources, storage resources, hardware read/write (H/W r/w) resources, network bandwidth (BW) resources, In-network Computing (INC) resources, or other computing resources.

RMO frameworks may provide interfaces to expose various types of computational resource information to tenants, such as the available Data Center (DC) resources, granularity of allocable DC resources, DC resource configuration options, available INC primitives or functionalities, INC resources, granularity of allocable INC resources, configuration of INC resources, or other computational information. In an example, the INC resources may include computing resources on programmable networking devices (e.g., Smart Network Interface Card (SmartNIC), Infrastructure Processing Unit (IPU), network switch, networking field-programmable gate array (FPGA)), where the programmable network device may be used to perform frequent and rapid (e.g., nearline-rate) computations for packet payloads.

Tenants may use information exposed from RMO frameworks to develop job or task requests that are aligned with the RMO framework configurations. Submitted jobs or tasks may require various resources managed by RMO frameworks. In an example, a RMO framework resource scheduler and admission controller (e.g., Yet Another Resource Negotiator (YARN) of the open-source Apache Hadoop distributed processing frameworks) may verify an availability of dominant resources requested by tenants and determine whether to accept a specific tenant's job or task or reallocate the job or task to other computing nodes. However, this exposes a possibility for malicious exploitation of non-dominant resources that may not be actively managed or constrained by an RMO framework, which may disrupt the overall operation of the RMO framework. For example, a malicious user may attempt to avoid attack detection by requesting allocations for fewer dominant resources and instead exploit non-dominant resources (e.g., H/W r/w, GPU, Network BW, INC resource) to avoid processing constraints or detection, such as during a denial-of-service (DOS) attack. This exploitation of non-dominant resources may result in bottlenecks that degrade performance of legitimate user workloads. For computing applications executed within a given network, attackers may add or modify programs that recirculate or resubmit packets, repeatedly resulting in wasted cycles that could be otherwise used for line-rate packet processing.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The subject matter described herein provides technical solutions for technical problems facing resource management for multi-tenant applications in edge/cloud environments (e.g., far-edge, near-edge, regional datacenter, datacenter). Technical solutions described herein include improved resource management for dominant and non-dominant resources for edge/cloud multi-tenant applications. A resource management framework may be improved using an admission control mechanism within the framework. The admission control mechanism may include applications of Resilience Root of Trust (RRoT) and Differentiated Behavior Fingerprinting (DBF) within the resource management framework. The admission control mechanism may be used to balance disproportionate resource allocations by controlling an allocation of unconstrained resources, such as by controlling the allocation of unconstrained resources proportional to the requested dominant resources based on resource availability. The admission control mechanism may provide ongoing monitoring of dominant and non-dominant resource utilization, such as using a hybrid centralized-distributed telemetry collection approach. The telemetry may resource usage metrics monitored by a resource node manager, which may be used to monitor or manage dominant and nondominant resources. The resource management framework may also include a lightweight resource monitoring and policy enforcement mechanism on distributed networking elements to reduce or eliminate the malicious or unnecessary use of non-dominant resources.

This resource management framework provides advantages over approaches that do not track or control allocation or usage of non-dominant resources when allocating dominant resources. This framework may be used to prevent a malicious entity from requesting few dominant resources and exploiting non-dominant resources, such as by generating packets at end-hosts using limited dominant resources and recirculating packets multiple times within a programmable switch pipeline. This framework can be used to improve performance of legitimate distributed networked applications in edge/cloud computing environments.

In the following description, for purposes of explanation, numerous specific details are set forth in order to provide a thorough understanding of some example embodiments. It will be evident, however, to one skilled in the art that the present disclosure may be practiced without these specific details.

Figure 1:
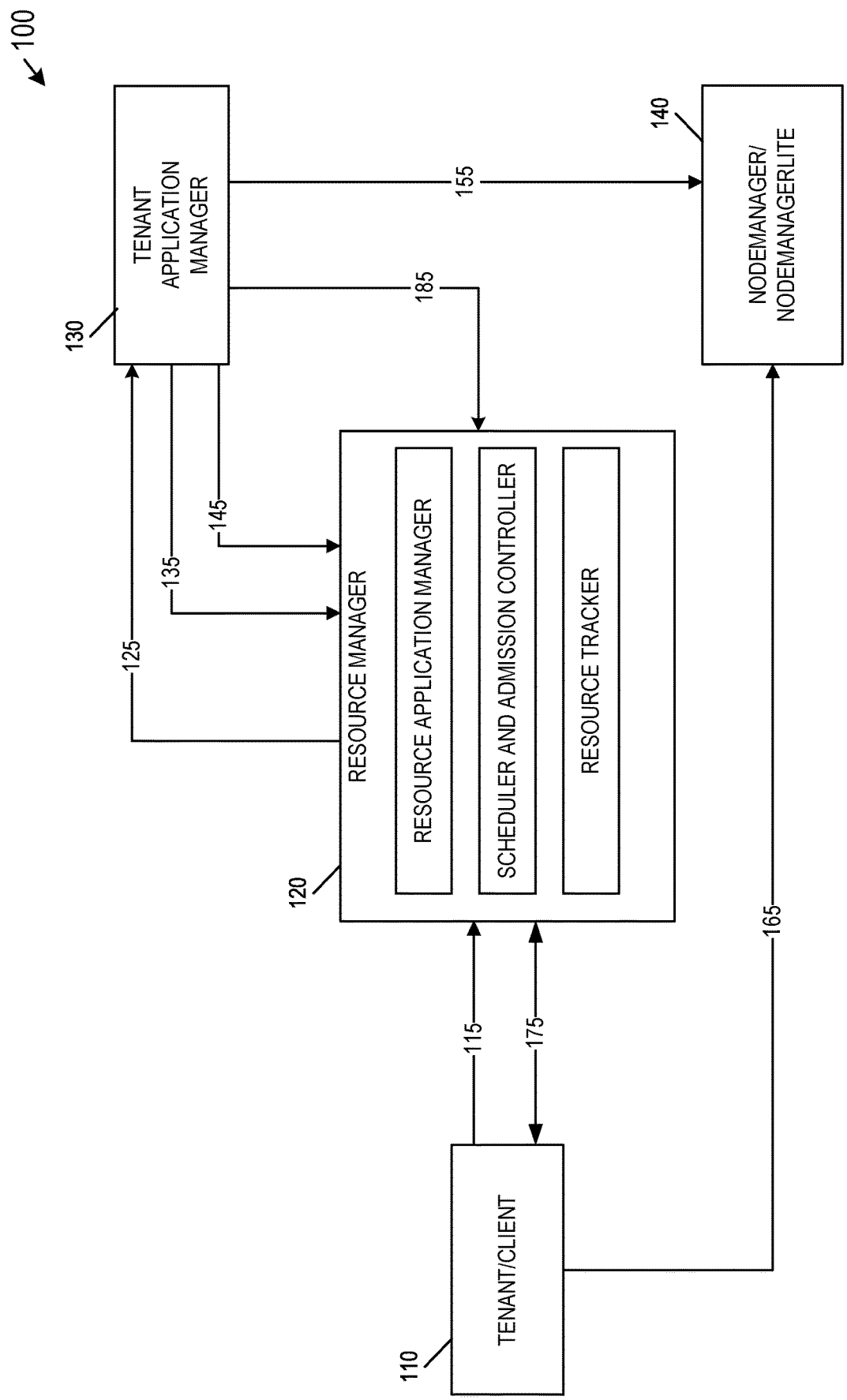
FIG. 1 is a block diagram illustrating a first resource management framework, according to an embodiment.

FIG. 1 is a block diagram illustrating a first resource management framework 100, according to an embodiment. Framework 100 includes various resource management components that may be used to provide improved distributed networked application performance. Framework 100 includes a tenant/client 110, a resource manager 120, a tenant application manager 130, and a node manager 140. The tenant/client 110 may include a client providing direct request, or may include a separable tenant service that is operated on behalf of a client. The resource manager 120 may include a resource application manager, a scheduler, and admission controller, and a resource tracker.

Framework 100 shows various interactions between resource management components. Initially, a tenant/client 110 may submit an application request 115 to the resource manager 120. The application request 115 may be received at the resource application manager within the resource manager 120, which may allocate resources to initiate the tenant application manager 130, such as by allocating a container for data center (DC) resources. Upon initiation, the tenant application manager 130 may register itself 135 with the resource manager 120. Following registration 135, the tenant application manager 130 may negotiate resources 145 from the resource manager 120. The admission controller within the resource manager 120 may verify availability of requested dominant resources. If dominant resources are available, the scheduler may allocate resources accordingly. Resources nodes may be notified about resource allocation for the application request.

Following allocation of resources, the tenant application manager 130 may inform the node manager 140 of the allocated resource to be used during execution of the application request. The allocation of resources may include identifying dominant and non-dominant resources resident at the node manager 140. The tenant/client 110 may then provide an application task (e.g., application code, commands, data for processing) for execution 165 in the allocated dominant and non-dominant resources. During application execution, the tenant/client 110 may communicate with the resource application manager within the resource manager 120 to monitor 175 the application execution status. Once processing is complete, the tenant application manager 130 may un-register itself 185 with the resource manager 120.

One or more of the managers within framework 100 may be implemented as an architected system or on a single device. In an example, a single server device may include the resource manager 120, the tenant application manager 130, and the node manager 140. In another example, the resource manager 120 may be implemented on a network interface device, the application manager 130 implemented on a remote server device, and the node manager 140 and dominant and non-dominant resources implemented on a dedicated processing device. One or more of the managers or the dominant and non-dominant resources may be implemented on a multi-core processor device, such as a multi-core processing unit (PU) or a multi-core infrastructure processing unit (IPU). In a multi-core example, the managers may be implemented in one core of a multi-core PU, and the dominant and non-dominant resources may execute the application task in one or more other cores of the multi-core PU. In a first IPU example, an IPU may be used to control a processor external to the IPU that implements the managers and control dominant and non-dominant resource processors that execute the application task. In a second IPU example, an IPU may be connected to multiple processors external to the IPU that include various dominant and non-dominant resources, where one of the connected processors executes a first portion of the application task as the dominant resource, and another of the connected processors executes a second portion of the application task as the non-dominant resource. In a third IPU example, an IPU may include a multi-core IPU, including a first core to execute a first portion of the application task as the dominant resource and another core to execute a second portion of the application task as the non-dominant resource.

Figure 2:
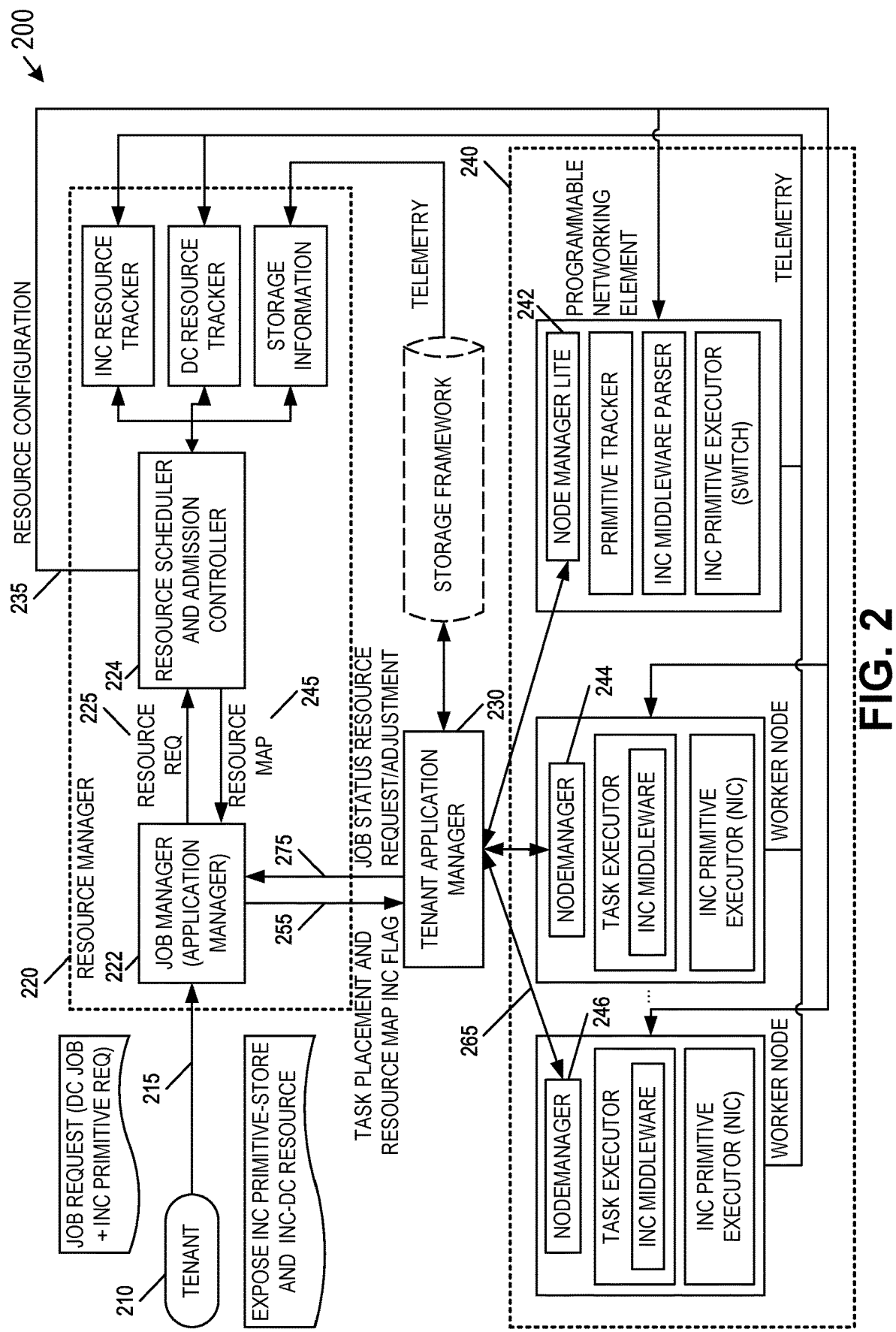
FIG. 2 is a block diagram illustrating a second distributed processing framework, according to an embodiment.

FIG. 2 is a block diagram illustrating a second distributed processing framework 200, according to an embodiment. Framework 200 includes additional details of various components and process steps for an improved global resource manager (e.g., cluster-wide resource manager), which may be used to provide improved job scheduling for various applications from one or more tenants 210. Framework 200 may include a pool of computing resources 240, such as servers or disaggregated heterogeneous computing resources. In an example, computing resources 240 may include multiple network-connected processing racks, such as may be used in an edge/cloud computing environment, a central computing office, a regional data center, or another processing entity.

Framework 200 may include primary computing daemon (e.g., master computing daemon) resource manager 220, one or more secondary daemons called node managers 242, 244, 246 (e.g., one node manager per resource node), and a tenant application manager 230 (e.g., tenant or client application manager application). A given global resource manager 220 may operate with one tenant application manager 230 per application, where each application includes a single job or a directed acyclic graph (DAG) of jobs. The resource manager 220 may be used to arbitrate resources among all applications or tenants 210 in a given system. The per-application tenant application manager 230 may include a framework-specific library that is tasked with negotiating resources from the resource manager 220 and working with the node managers 242, 244, 246 to execute and monitor the tasks.

The resource manager 220 may include a job manager (e.g., resource application manager) 222, and a combined resource scheduler and admission controller 224. The job manager 222 may receive and accept job requests 215 from a tenant 210. In response to a job request, the job manager 222 may negotiate a first set of resources 225 (e.g., a first container for server or DC-based resources) for executing a task via the application-specific tenant application manager 230. This resource negotiation may include requesting resources 225 from the resource scheduler and admission controller 224, determining resource configuration 235, receiving a resource map 245 from the resource scheduler and admission controller 224, and placement of the task 255 on the tenant application manager 230. The job manager 222 may provide a service for restarting the tenant application manager 230 on failure, and may also allow tenants to specify explicit requirements for non-dominant in-network computing resources. The resource scheduler and admission controller 224 may verify eligibility of the tenant 210 to access the requested resources and allocate resources to the various running applications belonging to the tenant 210. The resource scheduler and admission controller 224 may also control allocation of unconstrained resources proportional to the requested dominant resources.

A node manager lite 242 may be used for resource-constrained programmable networking elements. The node manager lite 242 may be used to manage resources at networking elements, monitoring resource usage, and reporting resource usage by providing telemetry back to the resource scheduler and admission controller 224 within the resource manager 220.

The tenant application manager 230 may be used to negotiate appropriate resources from the resource scheduler and admission controller 224, cause one or more tasks to be executed 265 on node managers 242, 244, 246, track status of task running on allocated resources, and monitor for progress of tasks. Each application may include a single job consisting of multiple tasks submitted to framework 200. The tenant application manager 230 manager may be responsible for negotiating both dominant and non-dominant resources with the resource manager 220, tracking the status, and monitoring progress of each application. The tenant application manager 230 manager may also be used to provide job status resource requests or adjustments back to the job manager 222. Once an application is started, the tenant application manager 230 may send periodic health reports to the resource manager 220.

The tenant 210 may use an extended interface to submit a request that includes explicit requirements for non-dominant in-network computing (INC) resources. An example request for INC resources is shown in Table 1:

TABLE 1

Non-dominant INC Resource Request

<ResourceSpecification>
  <ServerCentricResources>
    <numberOfVMs>4</numberOfVMs>
    <VMConfiguration>

TABLE 1-continued

Non-dominant INC Resource Request

<numberOfCores>16</numberOfCores>
      <memoryInGb>8</memoryInGb>
      ...
    </VMConfiguration>
    ...
  </ServerCentricResources>
  <NonDominantResources>
    <INCResources>
      <numberOfPipelines>4</numberOfPipelines>
      <numberOfParsersPerPipeline>1</numberOfParsersPerPipeline>
      <numberOfMATStages>2</numberOfMATStages>
      <StageParameters>
        <SRAMInMb>1</SRAMInMb>
        <TCAMEntries>10<TCAMEntries>
      </StageParameters>
      <BandwidthInGbps>1</BandwidthInGbps>
    </INCResources>
  </NonDominantResources>
</ResourceSpecification>

The format shown in Table 1 may be used to specify requested non-dominant in-network computing resources. If a tenant 210 does not specify requirements within a job request, the job manager 222 may be used to determine requirements, such as based on default thresholds or existing knowledge about behavior of the application.

Figure 3:
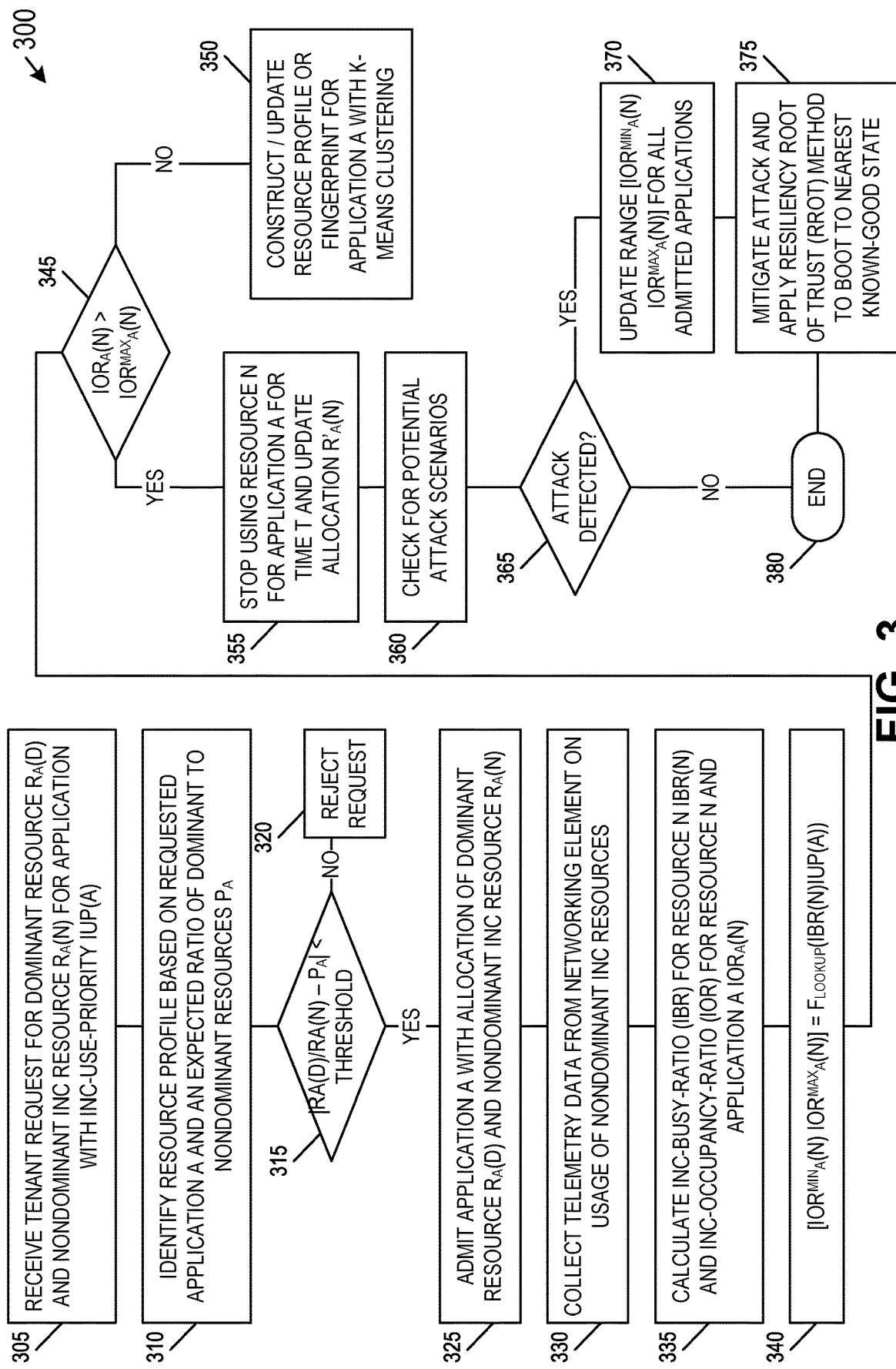
FIG. 3 is a flowchart illustrating an admission control and resource usage tracking workflow, according to an embodiment.

FIG. 3 is a flowchart illustrating an admission control and resource usage tracking workflow 300, according to an embodiment. Workflow 300 may be used to provide an improved admission control mechanism for allowing or excluding resource requests. The admission control may include Differentiated Behavior Fingerprinting (DBF), which may be used to establish baseline ratio fingerprints of exercise of various combinations of dominant and non-dominant resources. Each baseline ratio may be established by tracking resource usage and other application flow characteristics over long periods of time (e.g., hours, days). Each baseline ratio may be arranged in a position within a multi-dimensional unit-sphere, and the collection of baseline ratios may be used as a resource fingerprint. The data may be clustered (e.g., using K-means clustering, Gaussian mixture models), and the generated clusters may serve as a set of fingerprints for applications that are determined to be legitimate. Each fingerprint may have an associated probability of occurrence and a distribution of resource demands across various resources. These resource fingerprints may be used to detect various attacks. In an example, an attack may be disguised as a job request with a combination of reduced requests for dominant resources and substantial requests for non-dominant resources. A resource usage ratio profile may be generated for the job request, such as based on telemetry provided by the non-dominant resource and the dominant resource. This resource usage ratio profile may be compared against a resource fingerprint to determine whether the behavior of the attack is sufficiently different from baseline behaviors indicated by the resource fingerprint. This may include determining whether the similarity between the resource usage ratio profile and the resource fingerprint crosses (e.g., transgresses) an attack detection threshold. Whenever a job request is flagged as having a demand shape that deviates too substantially from the resource fingerprint, the job request may be halted, or the job request or the job requestor may be added to a watchlist or blocklist. The watchlist may be used to identify a job request or job requestor that is to be subjected to additional evaluation, such as to determine whether the job requestor is executing an attack, or to determine whether the job request matches an attack profile. The blocklist may be used to prevent future requests for similar job requests or prevent future requests from the job requestor.

The admission control provided by workflow 300 may also include an Integration of Resilience Root of Trust (RRoT). In the Integration of RRoT, admission control may be facilitated by a Resilience Root of Trust (RRoT) that integrates into an INC node and into a broader International Mobile Telecommunications (IMT) network. The RRoT may be used to ensure physical INC nodes or IMT nodes are able to restart in a secure operating condition, or may employ a cyber-resilient reset (CRR) to reset operational state transitions to a nearest known-good operational state as defined by RRoT latch state. Admission controls may use attested RRoT to determine whether to admit a requested job into an INC or an IMT. In an example, updates to firmware or software of previously admitted nodes may include a new admission determination (e.g., readmission), such as to ensure updates or patches do not mistakenly result in an out-of-compliance operational INC or IMT node.

Workflow 300 may use one or more of the DBF and the RRoT to allow a job request or detect an attack. At 305, an application request may be received from a tenant. The application request may specify a dominant resource $r_A(D)$, a non-dominant INC resource $r_A(N)$, and an application A with INC-use-priority, IUP(A). At 310, a resource profile or fingerprint may be identified based on the requested application A and an expected ratio of dominant and non-dominant resources, PA. At 315, the difference between the fingerprint and expected ratio may be compared to a threshold 315. If the difference is not below the threshold (e.g., meets or exceeds the threshold), then the application request may be rejected 320.

If the difference is below the threshold, then the application may be admitted 325 with the dominant resource allocation $r_A(D)$ and the non-dominant INC resource allocation $r_A(N)$. At 330, the telemetry data may be collected from a networking element on the usage of non-dominant INC resources. At 335, an INC-busy-ratio (IBR) may be calculated for resource N, IBR(N), and an INC-occupancy-ratio (IOR) may be calculated for resource N and application A, $IOR_A(N)$. At 340, a lookup table may be used to determine minimum and maximum IOR values as $[IOR^{MIN}_A(N), IOR^{MAX}_A(N)] = F_{LOOKUP}(IBR(N), IUP(a))$.

At 345, the $IOR_A(N)$ may be compared 345 to $IOR^{max}_A(N)$. If $IOR_A(N)$ is less than $IOR^{max}_A(N)$, then a resource profile or fingerprint may be constructed or updated 350 for the application, such as using K-means clustering. If $IOR_A(N)$ is greater than $IOR^{max}_A(N)$, then an instruction may be issued 355 to stop using resource N for application A for time T, and to update allocation $r'_A(N)$. Potential attack scenarios may then be identified 360, and the application may be examined to determine whether an attack is detected 365. If an attack is detected, the range $[IOR^{min}_A(N), IOR^{max}_A(N)]$ may be updated 370 for all the admitted applications. At 375, the attack may be mitigated, and the RRoT may be applied to reboot to a nearest known-good state. Workflow 300 ends 380 after a reboot is completed or if an attack is not detected.

Figure 4:
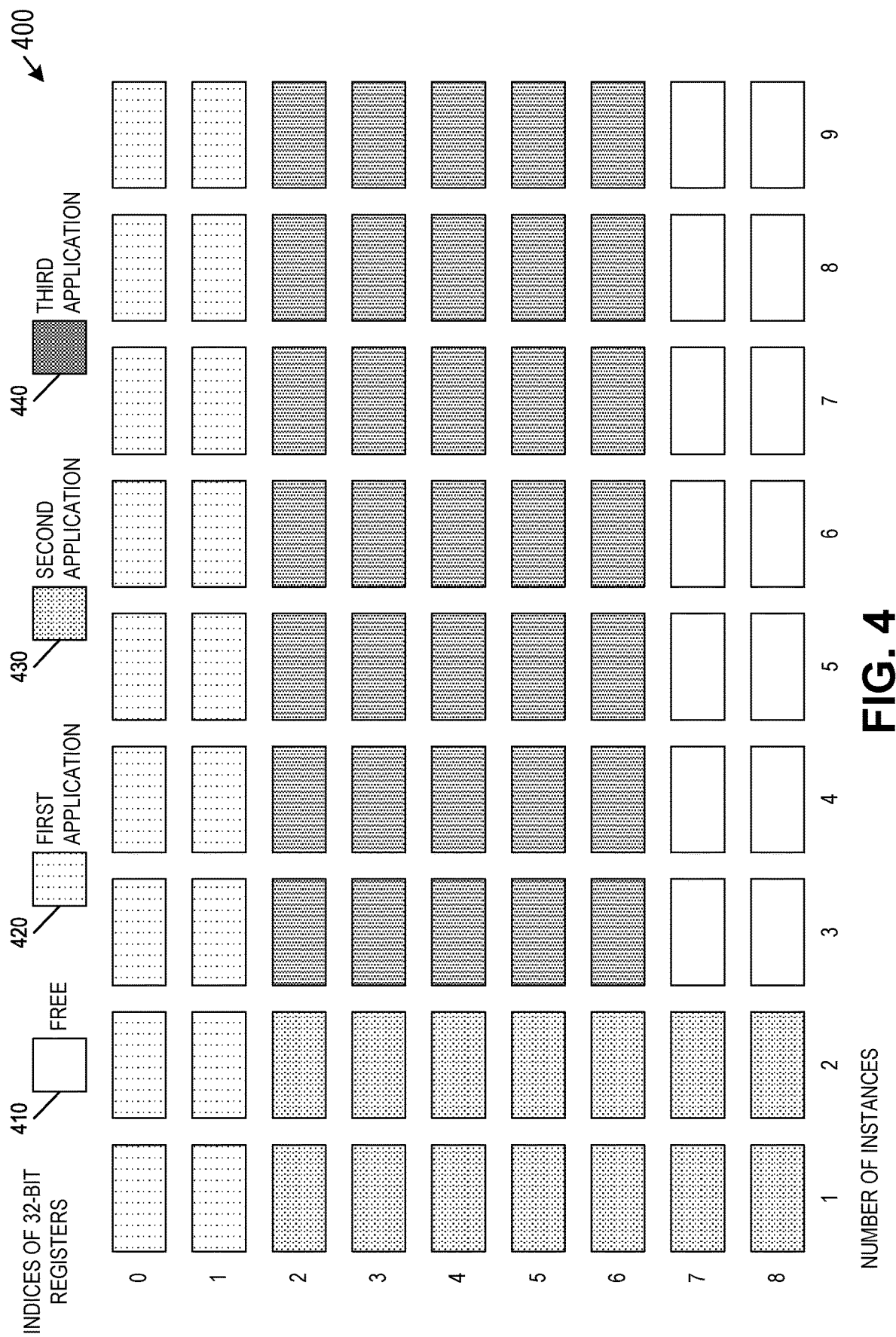
FIG. 4 is a block diagram illustrating a memory usage map, according to an embodiment.

FIG. 4 is a block diagram illustrating a memory usage map 400, according to an embodiment. Memory usage map 400 shows an example static random-access memory (SRAM) memory map that may be used in telemetry reporting and tracking of INC resource usage. As shown in FIG. 4, memory usage map shows a region of free memory 410, a region of memory used for a first application 420, a region of memory used for a second application 430, and a region of memory used for a third application 440.

INC resources may be well-suited for specific tasks or applications, and may be less well-suited for other tasks or applications. INC resources may be limited, and the subset of INC resources that are well-suited for a specific task further limits the number of available INC resources. A malicious user may exhaust INC resources by launching applications requesting INC resources that would otherwise be shared among other users, causing a denial of service (DoS) attack. These malicious users may include an intruder using a compromised credential, a malicious insider user, a legitimate user with intent to attack a targeted user for business competition, or another malicious user. This INC resource exhaustion may reduce or eliminate INC resource availability for legitimate users, applications, or tasks that rely on these INC resources. This INC resource exhaustion (e.g., INC DoS attack) may lead to significant reductions in performance or QoE degradation for INC-dependent legitimate users, applications, or tasks.

A local control agent running on networking elements may be used to track the usage of INC resources. The local control agent may collect statistics for various resource types and provide an interface for a centralized controller for on-demand queries or periodic reporting. In an example, the central controller may set rules for the local agent to send a summary report within a time window, or to send certain telemetry data whenever the resource usage exceeds a certain threshold (e.g., a threshold previously set by the controller). Application-specific telemetry information may be added to data packets containing the application payload, such as via in-band telemetry. An entity receiving the data packets may extract and aggregate in-band telemetry information from the packets, then provide a report to the central controller. The report may be used to determine application-specific usage of high bandwidth memory in an intermediate networking element, and may be used to generate a machine-readable or human-readable memory map, such as the example SRAM memory map 400.

The resource management framework within the central controller may be used to calculate additional data for telemetry reporting and INC resource usage tracking. The resource management framework may calculate an INC-Busy-Ratio (IBR) and an INC-Occupancy-Ratio (IOR) for each user, application, or task, such as during a predetermined sliding time-window. The resource management framework may also assign INC-Use-Priority (IUP) for each user, application, or task. For a given value or range of IBR, the resource management framework may use the IUP to prevent a user, application, or task from using an INC resource for a predetermined amount of time. Examples of the IBR and IOR detection values are shown in Table 2 and Table 3:

TABLE 2

Pre-Attack Detection Case - Provision by
DC Resource Manager to avoid DoS on INC

| Overall INC-Busy-Ratio | Maximum INC-Occupancy-Ratio (IOR) in % For Various INC-Use-Priority (IUP) per users/applications/Tasks | | | | |
|---|---|---|---|---|---|
| (IBR) in Cluster In % | IUP 1 (Highest) | IUP 2 | IUP 3 | ... | IUP n (Lowest) |
| 0-30 | No limit | No limit | <=70 | | <=40 |
| 30-60 | No limit | <=70 | <=40 | | <=20 |

TABLE 2-continued

Pre-Attack Detection Case - Provision by
DC Resource Manager to avoid DoS on INC

| Overall INC-Busy-Ratio | Maximum INC-Occupancy-Ratio (IOR) in % For Various INC-Use-Priority (IUP) per users/applications/Tasks | | | | |
|---|---|---|---|---|---|
| (IBR) in Cluster In % | IUP 1 (Highest) | IUP 2 | IUP 3 | . . . | IUP n (Lowest) |
| 60-80 | <=70 | <=40 | <=10 | | <=1 |
| 80-90 | <=40 | <=5 | 0 | | 0 |
| Above 90 | <=20 | 0 | 0 | | 0 |

TABLE 3

Attack Detected and Attacker not Identified Case - Provision
by DC Resource Manager to handle DoS on INC

| Overall INC-Busy-Ratio | Maximum INC-Occupancy-Ratio (IOR) in %- For Various INC-Use-Priority (IUP) per users/applications/Tasks | | | | |
|---|---|---|---|---|---|
| (IBR) in Cluster In % | IUP 1 (Highest) | IUP 2 | IUP 3 | . . . | IUP n (Lowest) |
| 0-30 | <=50 | <=30 | <=10 | | <=1 |
| 30-80 | <=30 | <=5 | 0 | | 0 |
| 80-90 | <=10 | 0 | 0 | | 0 |
| Above 90 | 0 | 0 | 0 | | 0 |

Table 2 shows an example pre-attack detection case for reducing or eliminating a DoS attack on INC resources. Similarly, Table 3 shows an example attack detection case for reducing or eliminating a DoS attack on INC resources, where the attacker has not yet been identified. Using the values in Table 2 or Table 3, the DC resource manager may determine maximum IOR values based on overall IBR. Table 2 may be used by a lookup table operation to determine a maximum IOR values, such as lookup $[IOR^{MIN}_A(N), IOR^{MAX}_A(N)]=F_{LOOKUP}(IBR(N), IUP(a))$ discussed at 340 in FIG. 3.

These techniques may be used to detect and mitigate attacks on edge computing resources. In an example DoS attack, a malicious user may launch multiple instances of an application at a far edge of a cloud computing environment (e.g., where computing resources are limited), causing the exhaustion of valuable edge computing resources and reducing the performance of legitimate applications. The malicious entity may also spoof location information and mimic movement from one location to another location, and this excess of information may cause an orchestrator to move computation instructions or data, such as moving from one far edge to another far edge, to a near edge, or to a regional cloud.

To reduce or eliminate these attacks on edge/cloud computing resources, the resource manager of the edge/cloud architecture may calculate overall EdgeCompResource-Busy-Ratio (EBR) and EdgeCompResource-Occupancy-Ratio (EOR), such as calculating EBR and EOR per user or per application over a sliding time-window across a multi-tiered edge/cloud. The EOR may be calculated per user or application to determine how frequently the given resource has been utilized by the user or application over a time window. The EBR may be calculated per resource to determine aggregate usage of a particular type of resource over a time window. The resource manager may also assign Edge-CompResource-Use-Priority (EUP) per user or per application. The resource manager may compare the EUP against a value or range of EBR, and based on this comparison, a user or application may be excluded from the use of one or more edge/cloud computing resources for a predetermined time. These edge/cloud resources may be heterogenous, and include combination of one or more processing resources such as CPUs, GPUs, FPGAs, processing accelerators, or other processing resource components. The EBR calculation for these heterogenous edge/cloud resources may be based on allocation constraints of each type of processing resource component with each heterogenous edge/cloud resource.

The resource management framework may use admission control to determine the nature or signature of a given application, such as to determine inference, transcoding, or mobile usage. Based on the nature or signature of a given application, the resource manager may allocate resources to avoid exploitation by the application. Various types of artificial intelligence (AI) may be used to gather apps and resources requirements over time and provide inputs to admission control, such as using machine learning (ML), reinforcement learning (RL), or other types of AI.

The resource management framework may use policies to prevent an attacker from taking control of edge/cloud computing resources. In an example, each edge/cloud computing node and associated infrastructure processing unit may require a consistent Pre-Attack Detection Policy (PADP), an Attack Detection and Mitigation Policy (ADMP), or other policy as a condition of a coordinated bootstrap of the edge/cloud computing framework. The RRoT techniques may be used to boot securely and attest to (e.g., verify compliance with) one or more of these policies. A converged edge/cloud resource manager may monitor attestations of PADP and ADMP periodically during operation, such as to detect or re-configure anomaly detection. An active attack on the PADP and ADMP (e.g., in case of insufficient hardened storage) may result in a continual recurrence of anomalistic patterns. As part of a resilient degradation strategy, a manufacturer default PADP and ADMP may be pre-programmed into edge/cloud computing devices by a manufacturer. A data center resiliency manager (DCRM) can request or force a transition to pre-programmed policies, such as by forcing a cyber-resilient reset (CRR) that causes the edge/cloud computing and infrastructure processing units to revert to manufacturer default policy. These solutions may be used to provide improved operational stability for edge/cloud computing devices, such as during a period where an active attacker is being identified or mitigated.

The resource management framework may implement one or more circuit-breaker actions. A circuit-breaker action may be based on varying a level of authenticity proof for access to a computing resource. A requestor may be required to provide increasing levels of authenticity proof for access, where the authenticity proof may increase corresponding to an increase in the amount of computing stress caused by each requestor. When a requestor is escalating demands for a given resource that is in critical supply, the resource management framework may interrupt the requestor with increasing frequency, and require the requestor to demonstrate various identification credentials or request information according to a standardized protocol. In an example, a requestor may be interrupted to verify that the requestor is who it claims to be, which may be determined according to a new challenge-response exchange, and may be required even if the requestor had previously furnished identification credentials. In another example, a requestor may be interrupted to provide proof-of-work, such as to demonstrate that the requestor is using the computing resource to accomplish a particular task or that a computation requires a specific computing resource. The frequency of interruption and the burdens of proof may be increased in proportion to increases in rates of demand by a specific requestor, such as by comparing demand rates to a median request rate for other requestors. Conversely, the frequency of interruption and the burdens of proof may be decreased based on reduced demand for a given resource or based on an increase in overall availability of the resource. Additional logic (e.g., game theory) may be used to identify and increase frequency of interruption and the burdens of proof for certain requestors or computing resources, which may be used to prevent requestors from requesting less saturated resources or less frequently challenged resources.

The resource management framework may implement ADMP logic to correlate identified attacks with the circumstances and timeframe of the attack. This may include capturing an appropriate level of telemetry based on the type and nature of the attack. This may be implemented by capturing telemetry during predetermined time intervals. In an example, when an attack is detected at a particular instance, telemetry may be stored for the time interval of the attack and for the time intervals preceding and following the attack. The ADMP logic may be used to correlate attacks over time with the captured telemetry time intervals to determine causality. A mitigation may be correlated with one or more attackers or types of attack, and the time-based telemetry may be used to improve or increase mitigation actions to improve attack recovery and reduce or eliminate future attack prevention.

Figure 5:
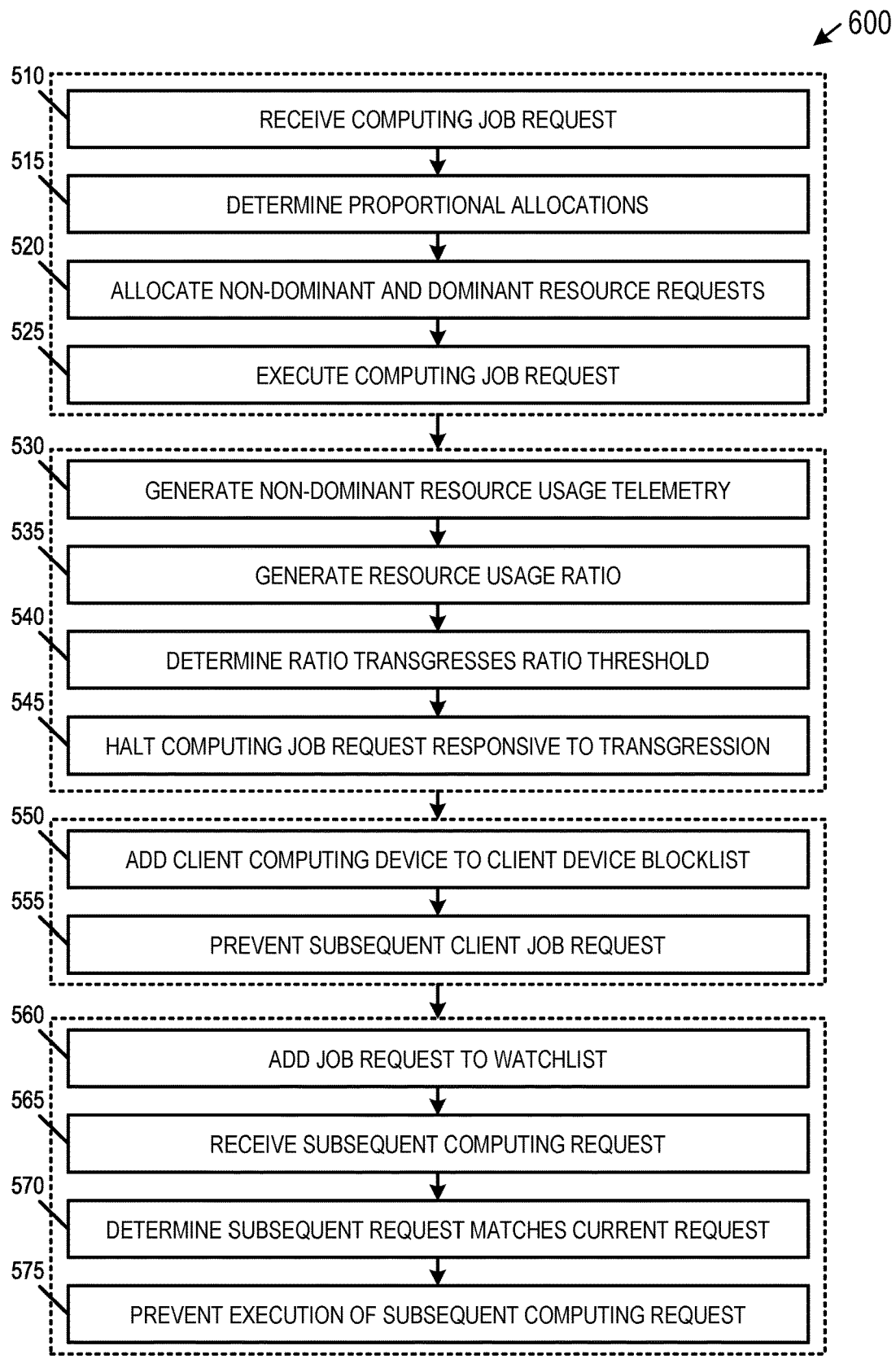
FIG. 5 is a flow diagram illustrating a method for managing dominant resources for multi-tenant applications within an edge/cloud computing environment, according to an embodiment.

FIG. 5 is a flow diagram illustrating a method 500 for managing dominant resources for multi-tenant applications within an edge/cloud computing environment, according to an embodiment. Method 500 includes receiving 510 a computing job request from a client computing device at a resource manager. The computing job request may include a dominant resource request for a dominant resource and a non-dominant resource request for a non-dominant resource. The dominant resource may include a first computing resource whose specifications constrain an execution of the computing job request. Method 500 includes determining 515 a proportional allocation of the non-dominant resource request and the dominant resource request. Method 500 includes allocating 520 the non-dominant resource request to the non-dominant resource and the dominant resource request to the dominant resource, where the allocating 520 is based on the proportional allocation. Method 500 includes executing 525 the computing job request at the non-dominant resource and the dominant resource.

Method 500 may include generating 530 a non-dominant resource usage telemetry at the non-dominant resource and a dominant resource usage telemetry at the dominant resource during execution of the computing job request. Method 500 may include generating 535 a resource usage ratio profile based on the non-dominant resource usage telemetry and the dominant resource usage telemetry. Method 500 may include determining 540 the resource usage ratio profile transgresses a resource usage ratio threshold. Method 500 may include halting 545 the computing job request responsive to the resource usage ratio profile transgressing the resource usage ratio threshold.

Method 500 may include adding 550 the client computing device to a client device blocklist and preventing 555 a subsequent client job request from the client computing device. Method 500 may include adding 560 the computing job request to a computing request watchlist, receiving 565 a subsequent computing request, determining 570 the subsequent computing request is consistent with the computing job request, and preventing 575 the subsequent computing request from being executed. A dominant resource availability may be verified at an admission controller within the resource manager, and allocating the dominant resource may be responsive to verifying the dominant resource availability. Allocating the non-dominant resource request may be based further on a negotiation for the non-dominant resource between a tenant application manager and the resource manager. Upon completion of a job request, an application result may be provided to the client computing device, and the tenant application manager may be un-registering at the resource manager.

Figure 6A:
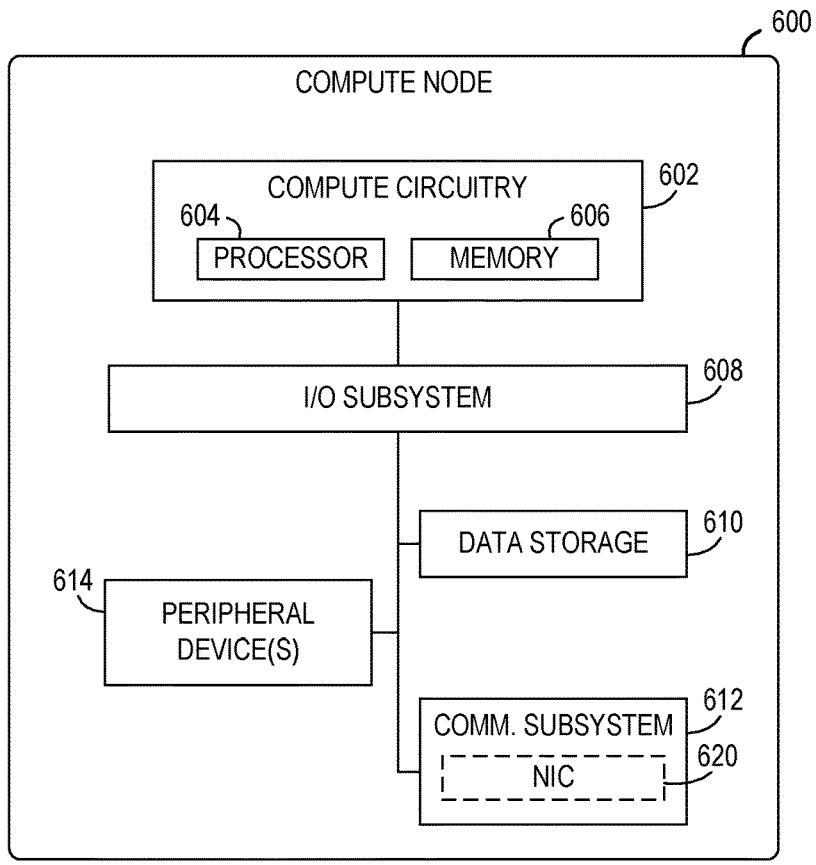
FIGS. 6A and 6B provide an overview of example components within a computing device in an edge computing system, according to an embodiment.
Figure 6B:
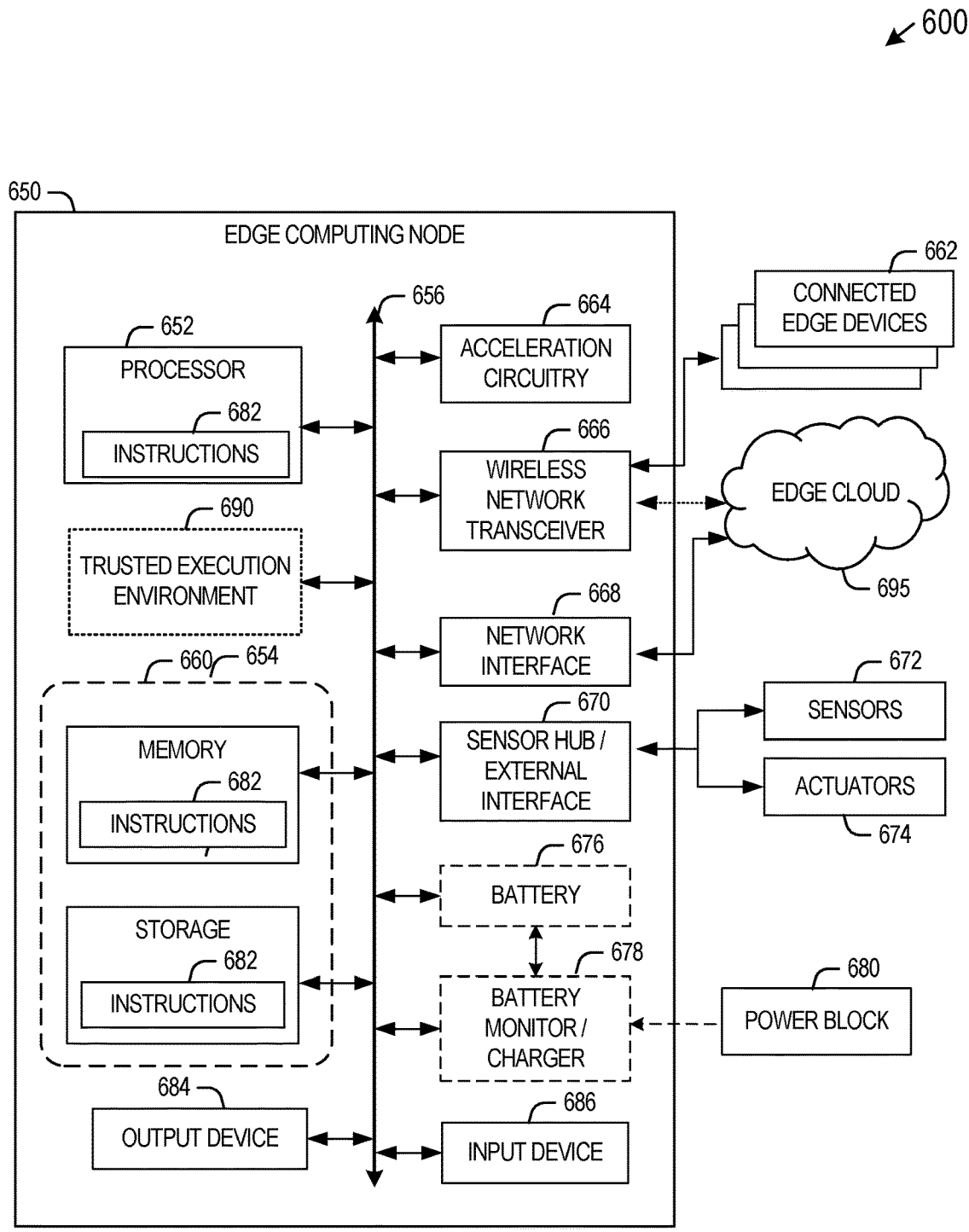

FIGS. 6A and 6B provide an overview of example components within a computing device in an edge computing system 600, according to an embodiment. In further examples, any of the compute nodes or devices discussed with reference to the present edge computing systems and environment may be fulfilled based on the components depicted in FIGS. 6A and 6B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 6A, an edge compute node 600 includes a compute engine (also referred to herein as "compute circuitry") 602, an input/output (I/O) subsystem 608 (also referred to herein as "I/O circuitry"), data storage 610 (also referred to herein as "data storage circuitry"), a communication circuitry subsystem 612, and, optionally, one or more peripheral devices 614 (also referred to herein as "peripheral device circuitry"). In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 (also referred to herein as "processor circuitry") and a memory 606 (also referred to herein as "memory circuitry"). The processor 604 may be embodied as any type of processor capable of performing the functions described herein (e.g., executing an application). For example, the processor 604 may be embodied as a multi-core processor(s), a microcontroller, a processing unit, a specialized or special purpose processing unit, or other processor or processing/controlling circuit.

In some examples, the processor 604 may be embodied as, include, or be coupled to an FPGA, an application specific integrated circuit (ASIC), reconfigurable hardware or hardware circuitry, or other specialized hardware to facilitate performance of the functions described herein. In some examples, the processor 604 may be embodied as a specialized x-processing unit (xPU) also known as a data processing unit (DPU), infrastructure processing unit (IPU), or network processing unit (NPU). Such an xPU may be embodied as a stand-alone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that a xPU, a SOC, a CPU, and other variations of the processor 604 may work in coordination with each other to execute many types of operations and instructions within and on behalf of the compute node 600.

The memory 606 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One particular type of DRAM that may be used in a memory module is synchronous dynamic random-access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 606 may be integrated into the processor 604. The memory 606 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0," set to logical "1," set to an intermediary resistance value) are accomplished by applying one or more current pulses to the at least two electrodes, in which the pulses have a particular current magnitude and duration. For instance, a long low current pulse (SET) applied to the at least two electrodes may cause the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the memory 606, and other components of the compute circuitry 602, into the compute circuitry 602.

The one or more illustrative data storage devices/disks 610 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 610 may include a system partition that stores data and firmware code for the data storage device/disk 610. Individual data storage devices/disks 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway of an implementing edge computing system). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally, or alternatively, in such examples, the local memory of the NIC 620 may be integrated into one or more components of the client compute node at the board level, socket level, chip level, and/or other levels.

Additionally, in some examples, a respective compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node (whether a client, gateway, or aggregation node) in an edge computing system or like forms of appliances, computers, subsystems, circuitry, or other components.

In a more detailed example, FIG. 6B illustrates a block diagram of an example of components that may be present in an edge computing node 650 for implementing the techniques (e.g., operations, processes, methods, and methodologies) described herein. This edge computing node 650 provides a closer view of the respective components of node 600 when implemented as or as part of a computing device (e.g., as a mobile device, a base station, server, gateway, etc.). The edge computing node 650 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 650, or as components otherwise incorporated within a chassis of a larger system.

The edge computing device 650 may include processing circuitry in the form of a processor 652, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, California. As an example, the processor 652 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 652 and accompanying circuitry may be provided in a single socket form factor, multiple socket form factor, or a variety of other formats, including in limited hardware configurations or configurations that include fewer than all elements shown in FIG. 6B.

The processor 652 may communicate with a system memory 654 over an interconnect 656 (e.g., a bus). Any number of memory devices may be used to provide for a given amount of system memory. As examples, the memory 654 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on Bluetooth Low Energy (BLE), or another low power radio, to save power. More distant connected edge devices 662, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 666 (e.g., a radio transceiver) may be included to communicate with devices or services in a cloud (e.g., an edge cloud 695) via local or wide area network protocols. The wireless network transceiver 666 may be a low-power wide-area (LPWA) transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 695 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, global navigation system (e.g., GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 650. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 676 may power the edge computing node 650, although, in examples in which the edge computing node 650 is mounted in a fixed location, it may have a power supply coupled to an electrical grid, or the battery may be used as a backup or for temporary capabilities. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676, if included. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, California, among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 660 may include instructions to direct the processor 652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 682 on the processor 652 (separately, or in combination with the instructions 682 of the machine readable medium 660) may configure execution or operation of a trusted execution environment (TEE) 690. In an example, the TEE 690 operates as a protected area accessible to the processor 652 for secure execution of instructions and secure access to data. Various implementations of the TEE 690, and an accompanying secure area in the processor 652 or the memory 654 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 650 through the TEE 690 and the processor 652.

Figure 7:
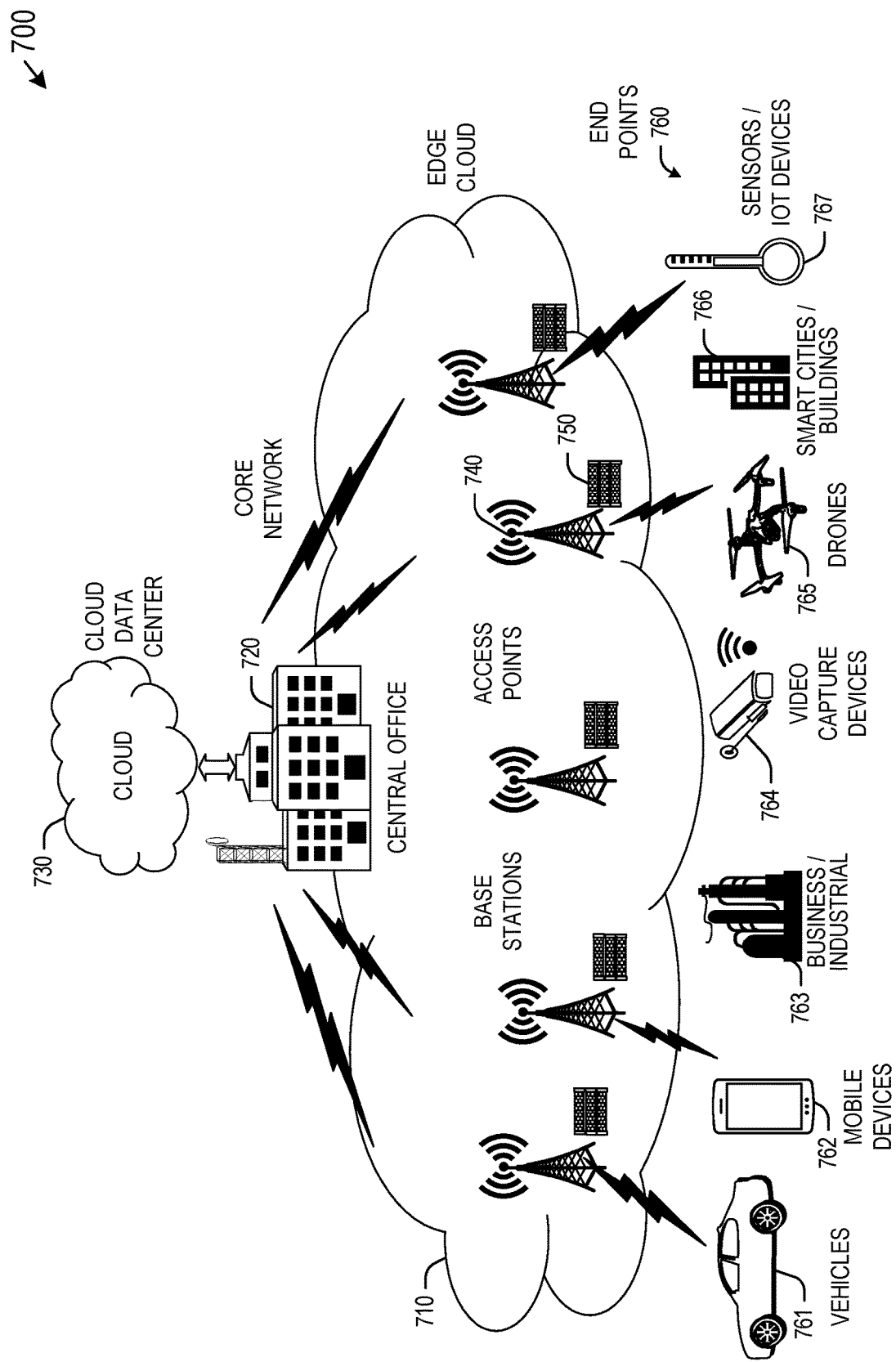
FIG. 7 is a block diagram showing an overview of a configuration for edge computing, according to an embodiment.

FIG. 7 is a block diagram showing an overview of a configuration for edge computing, which includes a layer of processing referred to in many of the following examples as an "edge cloud." As shown, the edge cloud 710 is co-located at an edge location, such as an access point or base station 740, a local processing hub 750, or a central office 720, and thus may include multiple entities, devices, and equipment instances. The edge cloud 710 is located much closer to the endpoint (consumer and producer) data sources 760 (e.g., autonomous vehicles 761, user equipment 762, business and industrial equipment 763, video capture devices 764, drones 765, smart cities and building devices 766, sensors and IoT devices 767, etc.) than the cloud data center 730. Compute, memory, and storage resources which are offered at the edges in the edge cloud 710 are critical to providing ultra-low latency response times for services and functions used by the endpoint data sources 760 as well as reduce network backhaul traffic from the edge cloud 710 toward cloud data center 730 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce an amount or number of resources needed for network services, through the distribution of more resources which are located closer both geographically and in network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge," "close edge," "local edge," "middle edge," or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 8:
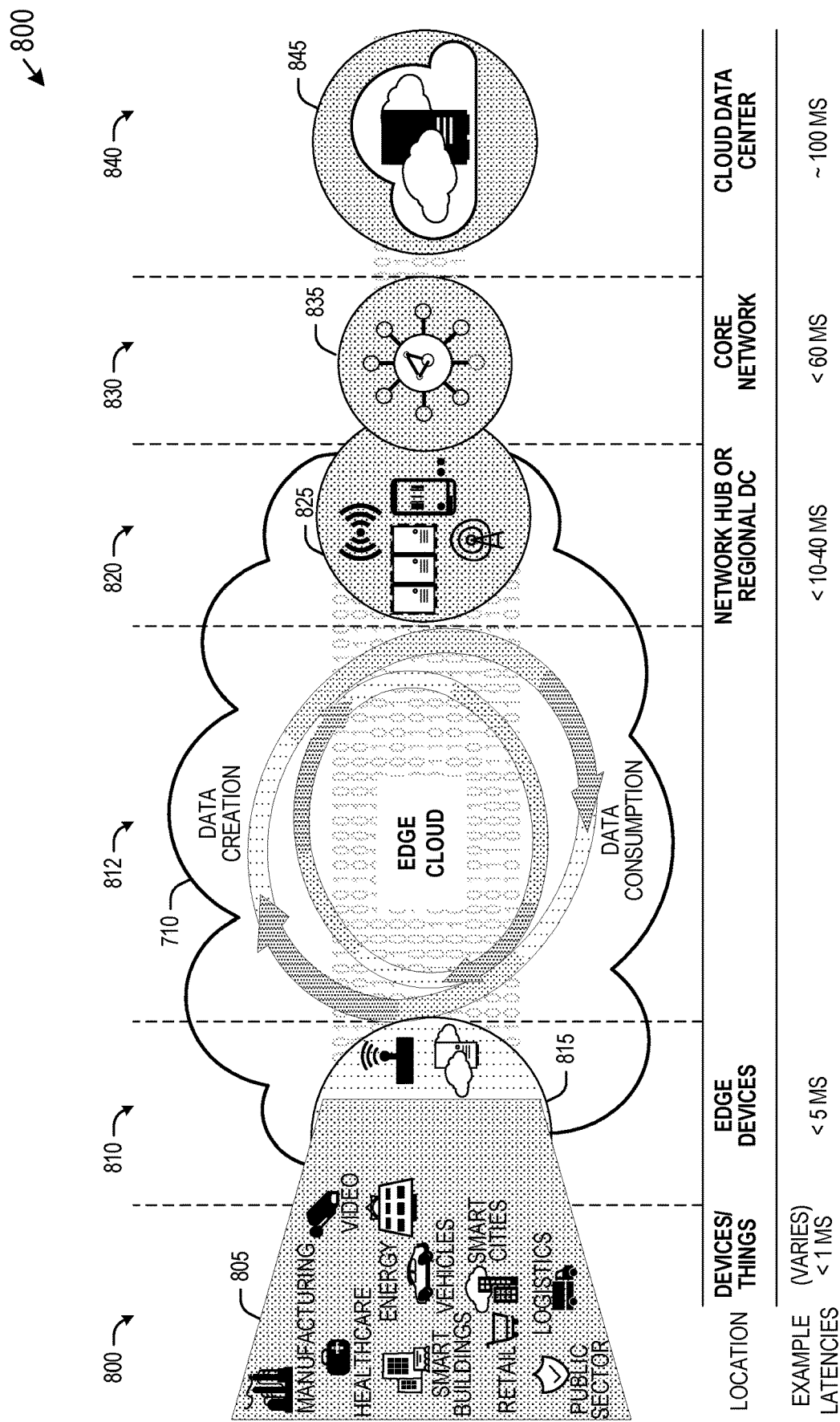
FIG. 8 illustrates operational layers among endpoints, an edge cloud, and cloud computing environments, according to an embodiment.

FIG. 8 illustrates operational layers among endpoints, an edge cloud, and cloud computing environments 800, according to an embodiment. Specifically, FIG. 8 depicts examples of computational use cases 805, utilizing the edge cloud 710 among multiple illustrative layers of network computing. The layers begin at an endpoint (devices and things) layer 800, which accesses the edge cloud 710 to conduct data creation, analysis, and data consumption activities. The edge cloud 710 may span multiple network layers, such as an edge devices layer 810 having gateways, on-premise servers, or network equipment (nodes 815) located in physically proximate edge systems; a network access layer 820, encompassing base stations, radio processing units, network hubs, regional data centers (DC), or local network equipment (equipment 825); and any equipment, devices, or nodes located therebetween (in layer 812, not illustrated in detail). The network communications within the edge cloud 710 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 800, under 5 ms at the edge devices layer 810, to even between 10 to 40 ms when communicating with nodes at the network access layer 820. Beyond the edge cloud 710 are core network 830 and cloud data center 840 layers, each with increasing latency (e.g., between 50-60 ms at the core network layer 830, to 100 or more ms at the cloud data center layer). As a result, operations at a core network data center 835 or a cloud data center 845, with latencies of at least 50 to 100 ms or more, will not be able to accomplish many time-critical functions of the use cases 805. Each of these latency values are provided for purposes of illustration and contrast; it will be understood that the use of other access network mediums and technologies may further reduce the latencies. In some examples, respective portions of the network may be categorized as "close edge," "local edge," "near edge," "middle edge," or "far edge" layers, relative to a network source and destination. For instance, from the perspective of the core network data center 835 or a cloud data center 845, a central office or content data network may be considered as being located within a "near edge" layer ("near" to the cloud, having high latency values when communicating with the devices and endpoints of the use cases 805), whereas an access point, base station, on-premise server, or network gateway may be considered as located within a "far edge" layer ("far" from the cloud, having low latency values when communicating with the devices and endpoints of the use cases 805). It will be understood that other categorizations of a particular network layer as constituting a "close," "local," "near," "middle," or "far" edge may be based on latency, distance, number of network hops, or other measurable characteristics, as measured from a source in any of the network layers 800-840.

The various use cases 805 may access resources under usage pressure from incoming streams, due to multiple services utilizing the edge cloud. To achieve results with low latency, the services executed within the edge cloud 710 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 710 may provide the ability to serve and respond to multiple applications of the use cases 805 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 710 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 710 (network layers 800-840), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco," or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 710.

As such, the edge cloud 710 is formed from network components and functional features operated by and within edge gateway nodes, edge aggregation nodes, or other edge compute nodes among network layers 810-830. The edge cloud 710 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 710 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 710 may be servers, multi-tenant servers, appliance computing devices, and/or any other type of computing devices. For example, the edge cloud 710 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 6B. The edge cloud 710 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 9:
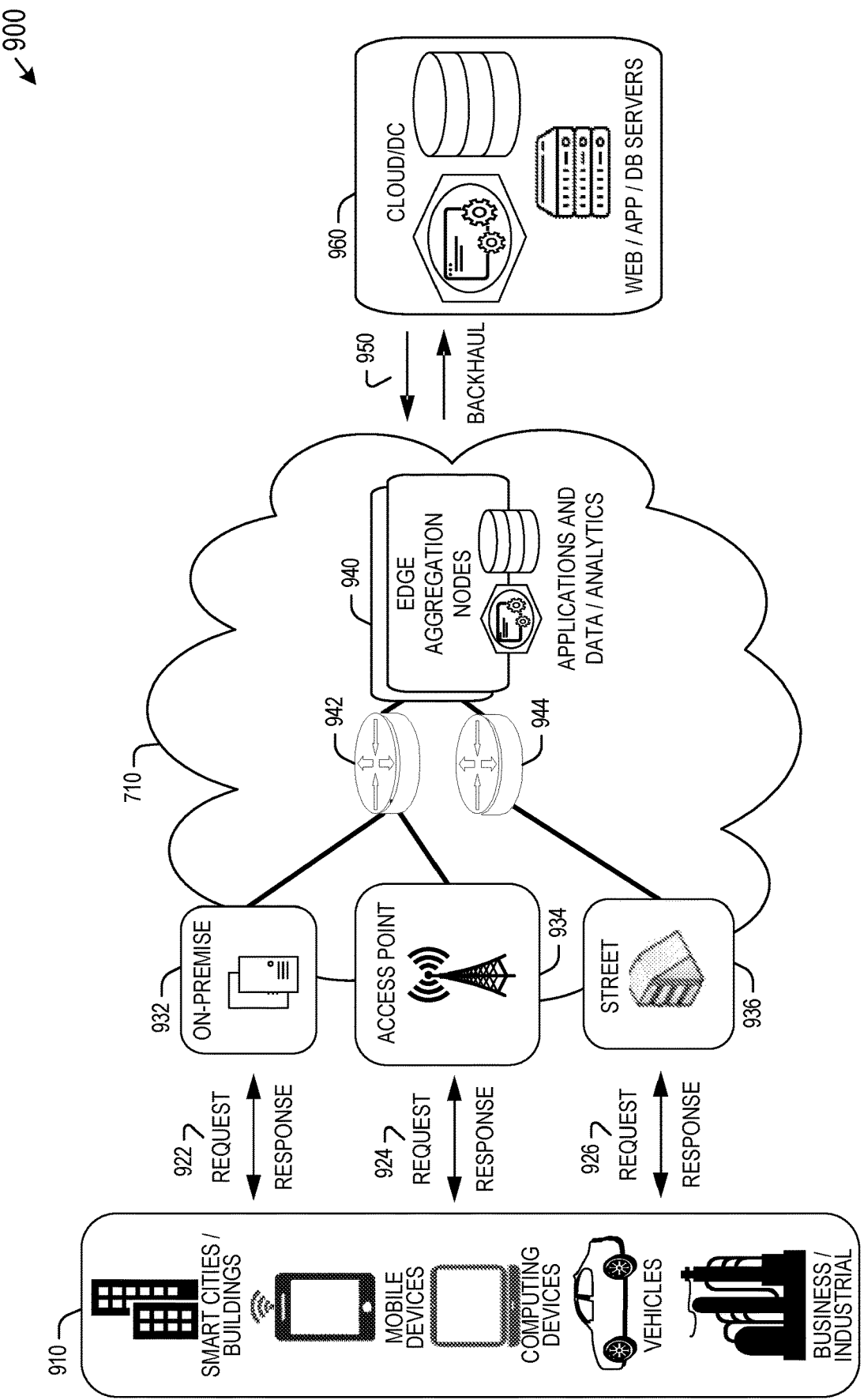
FIG. 9 illustrates an example approach for networking and services in an edge computing system, according to an embodiment.

FIG. 9 illustrates an example approach for networking and services in an edge computing system, according to an embodiment. In FIG. 9, various client endpoints 910 (in the form of mobile devices, computers, autonomous vehicles, business computing equipment, industrial processing equipment) exchange requests and responses that are specific to the type of endpoint network aggregation. For instance, client endpoints 910 may obtain network access via a wired broadband network, by exchanging requests and responses 922 through an on-premises network system 932. Some client endpoints 910, such as mobile computing devices, may obtain network access via a wireless broadband network, by exchanging requests and responses 924 through an access point (e.g., cellular network tower) 934. Some client endpoints 910, such as autonomous vehicles may obtain network access for requests and responses 926 via a wireless vehicular network through a street-located network system 936. However, regardless of the type of network access, the TSP may deploy aggregation points 942, 944 within the edge cloud 710 to aggregate traffic and requests. Thus, within the edge cloud 710, the TSP may deploy various compute and storage resources, such as at edge aggregation nodes 940, to provide requested content. The edge aggregation nodes 940 and other systems of the edge cloud 710 are connected to a cloud or data center 960, which uses a backhaul network 950 to fulfill higher-latency requests from a cloud/data center for websites, applications, database servers, etc. Additional or consolidated instances of the edge aggregation nodes 940 and the aggregation points 942, 944, including those deployed on a single server framework, may also be present within the edge cloud 710 or other areas of the TSP infrastructure.

Figure 10:
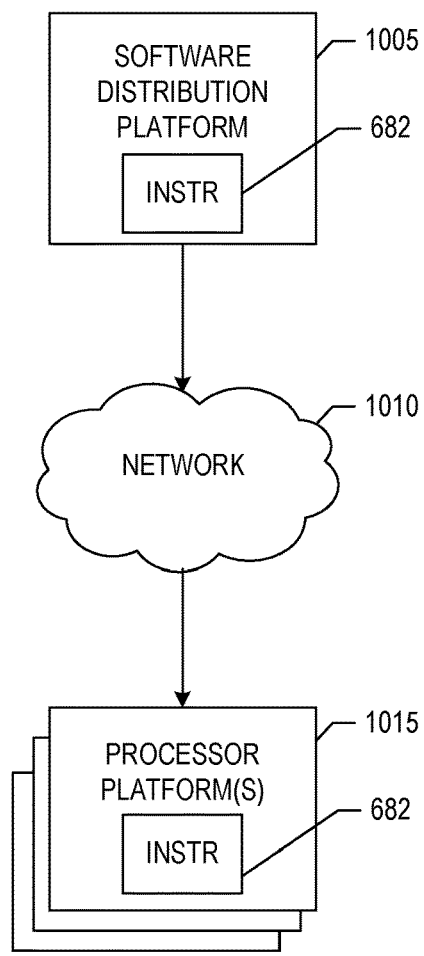
FIG. 10 illustrates an example software distribution platform to distribute software, according to an embodiment.

FIG. 10 illustrates an example software distribution platform 1005 to distribute software, according to an embodiment. The software distribution platform 1005 may include the example computer readable instructions 682 of FIG. 6B, to one or more devices, such as example processor platform(s) 1015 and/or example connected edge devices 810 of FIG. 8. The example software distribution platform 1005 may be implemented by any computer server, data facility, cloud service, etc., capable of storing and transmitting software to other computing devices (e.g., third parties, the example connected edge devices 810 of FIG. 8). Example connected edge devices may be customers, clients, managing devices (e.g., servers), third parties (e.g., customers of an entity owning and/or operating the software distribution platform 1005). Example connected edge devices may operate in commercial and/or home automation environments. In some examples, a third party is a developer, a seller, and/or a licensor of software such as the example computer readable instructions 682 of FIG. 6B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 10, the software distribution platform 1005 includes one or more servers and one or more storage devices. The storage devices store the computer readable instructions 682, which may correspond to the example computer readable instructions 682 of FIG. 6B, as described above. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 682 from the software distribution platform 1005. For example, the software, which may correspond to the example computer readable instructions 682 of FIG. 6B may be downloaded to the example processor platform(s) 1015 (e.g., example connected edge devices), which is/are to execute the computer readable instructions 682 to implement non-dominant resource management for edge multi-tenant applications. In some examples, one or more servers of the software distribution platform 1005 are communicatively connected to one or more security domains and/or security devices through which requests and transmissions of the example computer readable instructions 682 must pass. In some examples, one or more servers of the software distribution platform 1005 periodically offer, transmit, and/or force updates to the software (e.g., the example computer readable instructions 682 of FIG. 6B) to ensure improvements, patches, updates, etc., are distributed and applied to the software at the end user devices.

In the illustrated example of FIG. 10, the computer readable instructions 682 are stored on storage devices of the software distribution platform 1005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 682 stored in the software distribution platform 1005 are in a first format when transmitted to the example processor platform(s) 1015. In some examples, the first format is an executable binary in which particular types of the processor platform(s) 1015 can execute. However, in some examples, the first format is uncompiled code that requires one or more preparation tasks to transform the first format to a second format to enable execution on the example processor platform(s) 1015. For instance, the receiving processor platform(s) 1015 may need to compile the computer readable instructions 682 in the first format to generate executable code in a second format that is capable of being executed on the processor platform(s) 1015. In still other examples, the first format is interpreted code that, upon reaching the processor platform (s) 1015, is interpreted by an interpreter to facilitate execution of instructions.

Figure 11:
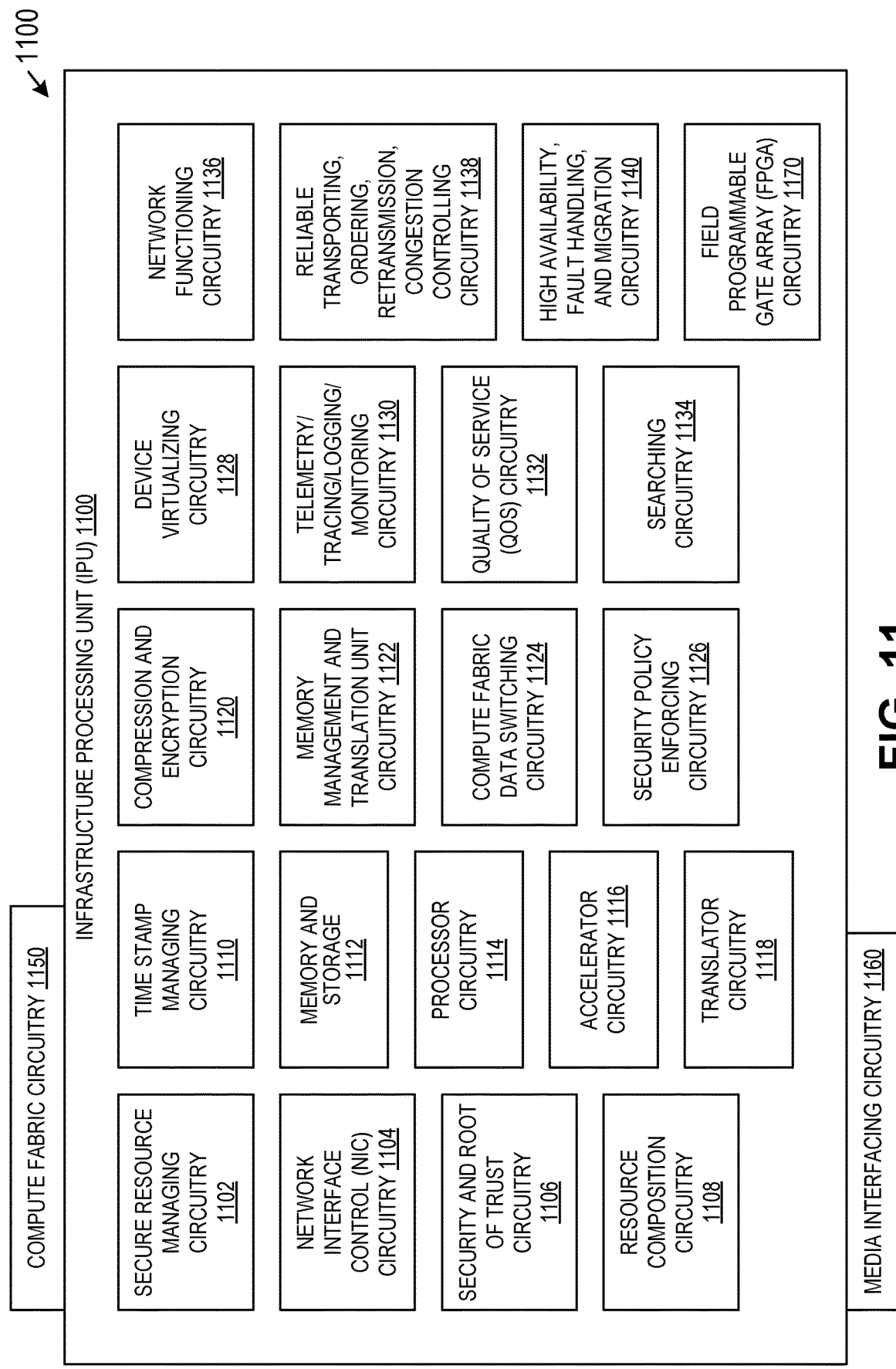
FIG. 11 depicts an example of an Infrastructure Processing Unit (IPU), according to an embodiment.

FIG. 11 depicts an example of an infrastructure processing unit (IPU). Different examples of IPUs disclosed herein enable improved performance, management, security and coordination functions between entities (e.g., cloud service providers), and enable infrastructure offload or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

In the illustrated example of FIG. 11, the IPU 1100 includes or otherwise accesses secure resource managing circuitry 1102, network interface controller (NIC) circuitry 1104, security and root of trust circuitry 1106, resource composition circuitry 1108, time stamp managing circuitry 1110, memory and storage 1112, processing circuitry 1114, accelerator circuitry 1116, or translator circuitry 1118. Any number or combination of other structure(s) can be used such as but not limited to compression and encryption circuitry 1120, memory management and translation unit circuitry 1122, compute fabric data switching circuitry 1124, security policy enforcing circuitry 1126, device virtualizing circuitry 1128, telemetry, tracing, logging and monitoring circuitry 1130, quality of service circuitry 1132, searching circuitry 1134, network functioning circuitry (e.g., routing, firewall, load balancing, network address translating (NAT), etc.) 1136, reliable transporting, ordering, retransmission, congestion controlling circuitry 1138, and high availability, fault handling and migration circuitry 1140 shown in FIG. 11. Different examples can use one or more structures (components) of the example IPU 1100 together or separately. For example, compression and encryption circuitry 1120 can be used as a separate service or chained as part of a data flow with vSwitch and packet encryption.

In some examples, IPU 1100 includes a field programmable gate array (FPGA) 1170 structured to receive commands from an CPU, XPU, or application via an API and perform commands/tasks on behalf of the CPU, including workload management and offload or accelerator operations. The illustrated example of FIG. 11 may include any number of FPGAs configured or otherwise structured to perform any operations of any IPU described herein.

Example compute fabric circuitry 1150 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 1160 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 1100, IPU 1100 is a root of a system (e.g., rack of servers or data center) and manages compute resources (e.g., CPU, xPU, storage, memory, other IPUs, and so forth) in the IPU 1100 and outside of the IPU 1100. Different operations of an IPU are described below.

In some examples, the IPU 1100 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 1100 is selected to perform a workload, secure resource managing circuitry 1102 offloads work to a CPU, xPU, or other device and the IPU 1100 accelerates connectivity of distributed runtimes, reduce latency, CPU and increases reliability.

In some examples, secure resource managing circuitry 1102 runs a service mesh to decide what resource is to execute workload, and provide for L7 (application layer) and remote procedure call (RPC) traffic to bypass kernel altogether so that a user space application can communicate directly with the example IPU 1100 (e.g., IPU 1100 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to, iSCSI, NVMe-oF, or CXL.

In some cases, the example IPU 1100 dynamically selects itself to run a given workload (e.g., microservice) within a composable infrastructure including an IPU, xPU, CPU, storage, memory, and other devices in a node.

In some examples, communications transit through media interfacing circuitry 1160 of the example IPU 1100 through a NIC/smartNIC (for cross node communications) or loopback back to a local service on the same host. Communications through the example media interfacing circuitry 1160 of the example IPU 1100 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 1100 prioritizes its processing to minimize the stalling of the requesting application. In some examples, the IPU 1100 schedules the prioritized message request issuing the event to execute a SQL query database and the example IPU constructs microservices that issue SQL queries and the queries are sent to the appropriate devices or services.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Example 1 is a system for managing dominant edge/cloud computing resources, the system comprising: memory controller processing circuitry; and a memory that includes, instructions, the instructions, when executed by the memory controller processing circuitry, cause the memory controller processing circuitry to: receive a computing job request from a client computing device at a resource manager, the computing job request including a dominant resource request for a dominant resource and a non-dominant resource request for a non-dominant resource, the dominant resource including a first computing resource whose specifications constrain an execution of the computing job request; determine a proportional allocation of the non-dominant resource request and the dominant resource request; allocate, based on the proportional allocation, the non-dominant resource request to the non-dominant resource and the dominant resource request to the dominant resource; and execute the computing job request at the non-dominant resource and the dominant resource.

In Example 2, the subject matter of Example 1 includes, the instructions further causing the memory controller processing circuitry to: generate a non-dominant resource usage telemetry at the non-dominant resource and a dominant resource usage telemetry at the dominant resource during execution of the computing job request; generate a resource usage ratio profile based on the non-dominant resource usage telemetry and the dominant resource usage telemetry; determine the resource usage ratio profile transgresses a resource usage ratio threshold; and halt the computing job request responsive to the resource usage ratio profile transgressing the resource usage ratio threshold.

In Example 3, the subject matter of Example 2 includes, the instructions further causing the memory controller processing circuitry to: add the client computing device to a client device blocklist; and prevent a subsequent client job request from the client computing device.

In Example 4, the subject matter of Examples 2-3 includes, the instructions further causing the memory controller processing circuitry to: add the computing job request to a computing request watchlist; receive a subsequent computing request; determine the subsequent computing request is consistent with the computing job request; and prevent the subsequent computing request from being executed.

In Example 5, the subject matter of Examples 1-4 includes, the instructions further causing the memory controller processing circuitry to verify a dominant resource availability at an admission controller within the resource manager, wherein allocating the non-dominant resource request is responsive to verifying the dominant resource availability.

In Example 6, the subject matter of Example 5 includes, the instructions further causing the memory controller processing circuitry to: initiate a tenant application manager to manage a resource container, the resource container including the non-dominant resource; and register the tenant application manager at the resource manager; wherein allocating the non-dominant resource request is further based on a negotiation for the non-dominant resource between the tenant application manager and the resource manager.

In Example 7, the subject matter of Example 6 includes, the instructions further causing the memory controller processing circuitry to: determine the computing job request has been completed; provide an application result to the client computing device; and un-register the tenant application manager at the resource manager.

In Example 8, the subject matter of Examples 1-7 includes, the instructions further causing the memory controller processing circuitry to instruct a node manager to execute the computing job request at the dominant resource.

In Example 9, the subject matter of Examples 1-8 includes, the instructions further causing the memory controller processing circuitry to: receive a status monitoring request at the resource manager; and provide a status monitoring update to the client computing device.

Example 10 is a method for managing dominant resources for multi-tenant applications within an edge/cloud computing environment, the method comprising: receiving a computing job request from a client computing device at a resource manager, the computing job request including a dominant resource request for a dominant resource and a non-dominant resource request for a non-dominant resource, the dominant resource including a first computing resource whose specifications constrain an execution of the computing job request; determining a proportional allocation of the non-dominant resource request and the dominant resource request; allocating, based on the proportional allocation, the non-dominant resource request to the non-dominant resource and the dominant resource request to the dominant resource; and executing the computing job request at the non-dominant resource and the dominant resource.

In Example 11, the subject matter of Example 10 includes, generating a non-dominant resource usage telemetry at the non-dominant resource and a dominant resource usage telemetry at the dominant resource during execution of the computing job request; generating a resource usage ratio profile based on the non-dominant resource usage telemetry and the dominant resource usage telemetry; determining the resource usage ratio profile transgresses a resource usage ratio threshold; and halting the computing job request responsive to the resource usage ratio profile transgressing the resource usage ratio threshold.

In Example 12, the subject matter of Example 11 includes, adding the client computing device to a client device blocklist; and preventing a subsequent client job request from the client computing device.

In Example 13, the subject matter of Examples 11-12 includes, adding the computing job request to a computing request watchlist; receiving a subsequent computing request; determining the subsequent computing request is consistent with the computing job request; and preventing the subsequent computing request from being executed.

In Example 14, the subject matter of Examples 10-13 includes, verifying a dominant resource availability at an admission controller within the resource manager, wherein allocating the dominant resource is responsive to verifying the dominant resource availability.

In Example 15, the subject matter of Example 14 includes, initiating a tenant application manager to manage a resource container, the resource container including the non-dominant resource; and registering the tenant application manager at the resource manager; wherein allocating the non-dominant resource request is further based on a negotiation for the non-dominant resource between the tenant application manager and the resource manager.

In Example 16, the subject matter of Example 15 includes, determining the computing job request has been completed; providing an application result to the client computing device; and un-registering the tenant application manager at the resource manager.

In Example 17, the subject matter of Examples 10-16 includes, instructing a node manager to execute the computing job request at the dominant resource.

In Example 18, the subject matter of Examples 10-17 includes, receiving a status monitoring request at the resource manager; and providing a status monitoring update to the client computing device.

Example 19 is at least one non-transitory machine-readable storage medium, comprising a plurality of instructions that, responsive to being executed with processing circuitry of a computer-controlled device, cause the processing circuitry to: receive a computing job request from a client computing device at a resource manager, the computing job request including a dominant resource request for a dominant resource and a non-dominant resource request for a non-dominant resource, the dominant resource including a first computing resource whose specifications constrain an execution of the computing job request; determine a proportional allocation of the non-dominant resource request and the dominant resource request; allocate, based on the proportional allocation, the non-dominant resource request to the non-dominant resource and the dominant resource request to the dominant resource; and execute the computing job request at the non-dominant resource and the dominant resource.

In Example 20, the subject matter of Example 19 includes, the plurality of instructions further causing the processing circuitry to: generate a non-dominant resource usage telemetry at the non-dominant resource and a dominant resource usage telemetry at the dominant resource during execution of the computing job request; generate a resource usage ratio profile based on the non-dominant resource usage telemetry and the dominant resource usage telemetry; determine the resource usage ratio profile transgresses a resource usage ratio threshold; and halt the computing job request responsive to the resource usage ratio profile transgressing the resource usage ratio threshold.

In Example 21, the subject matter of Example 20 includes, the plurality of instructions further causing the processing circuitry to: add the client computing device to a client device blocklist; and prevent a subsequent client job request from the client computing device.

In Example 22, the subject matter of Examples 20-21 includes, the plurality of instructions further causing the processing circuitry to: add the computing job request to a computing request watchlist; receive a subsequent computing request; determine the subsequent computing request is consistent with the computing job request; and prevent the subsequent computing request from being executed.

In Example 23, the subject matter of Examples 19-22 includes, the plurality of instructions further causing the processing circuitry to verify a dominant resource availability at an admission controller within the resource manager, wherein allocating the dominant resource is responsive to verifying the dominant resource availability.

In Example 24, the subject matter of Example 23 includes, the plurality of instructions further causing the processing circuitry to: initiate a tenant application manager to manage a resource container, the resource container including the non-dominant resource; and register the tenant application manager at the resource manager; wherein allocating the non-dominant resource request is further based on a negotiation for the non-dominant resource between the tenant application manager and the resource manager.

In Example 25, the subject matter of Example 24 includes, the plurality of instructions further causing the processing circuitry to: determine the computing job request has been completed; provide an application result to the client computing device; and un-register the tenant application manager at the resource manager.

In Example 26, the subject matter of Examples 19-25 includes, the plurality of instructions further causing the processing circuitry to instruct a node manager to execute the computing job request at the dominant resource.

In Example 27, the subject matter of Examples 19-26 includes, the plurality of instructions further causing the processing circuitry to: receive a status monitoring request at the resource manager; and provide a status monitoring update to the client computing device.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing dominant edge/cloud computing resources, the system comprising:
   memory controller processing circuitry; and
   a memory that includes instructions, the instructions, when executed by the memory controller processing circuitry, cause the memory controller processing circuitry to:
   receive a computing job request from a client computing device at a resource manager, the computing job request including a dominant resource request for a dominant resource and a non-dominant resource request for a non-dominant resource, the dominant resource including a first computing resource whose specifications constrain an execution of the computing job request;
   determine a proportional allocation of the non-dominant resource request and the dominant resource request;
   allocate, based on the proportional allocation, the non-dominant resource request to the non-dominant resource and the dominant resource request to the dominant resource;
   issue a request to cause the execution of the computing job request at the non-dominant resource and the dominant resource;
   receive a resource telemetry generated during execution of the computing job request, the resource telemetry including a non-dominant resource usage telemetry generated at the non-dominant resource and a dominant resource usage telemetry generated at the dominant resource during execution of the computing job request;
   determine, based on the resource telemetry, that the computing job request includes a non-dominant resource usage attack;
   issue a request to cause the computing job request to be halted based on the resource telemetry;
   add the client computing device to a client device blocklist; and
   prevent a subsequent client job request from the client computing device.

2. The system of claim 1, the instructions further causing the memory controller processing circuitry to:
   generate a resource usage ratio profile based on the non-dominant resource usage telemetry and the dominant resource usage telemetry;
   determine the resource usage ratio profile transgresses a resource usage ratio threshold; and
   issue a request to cause the computing job request to be halted responsive to the resource usage ratio profile transgressing the resource usage ratio threshold.

3. The system of claim 2, the instructions further causing the memory controller processing circuitry to:
   add the computing job request to a computing request watchlist;
   receive a subsequent computing request;
   determine the subsequent computing request is consistent with the computing job request; and
   prevent the subsequent computing request from being executed.

4. The system of claim 1, wherein the resource manager, the dominant resource, and the non-dominant resource are implemented within an infrastructure processing unit (IPU).

5. The system of claim 1, wherein the resource manager, the dominant resource, and the non-dominant resource are implemented within a core of a multi-core processor device.

6. The system of claim 1, the instructions further causing the memory controller processing circuitry to verify a dominant resource availability at an admission controller within the resource manager, wherein allocating the non-dominant resource request is responsive to verifying the dominant resource availability.

7. The system of claim 6, the instructions further causing the memory controller processing circuitry to:
   issue a request to cause a tenant application manager to manage a resource container, the resource container including the non-dominant resource; and
   register the tenant application manager at the resource manager;
   wherein allocating the non-dominant resource request is further based on a negotiation for the non-dominant resource between the tenant application manager and the resource manager.

8. The system of claim 7, the instructions further causing the memory controller processing circuitry to:
   determine the computing job request has been completed;
   provide an application result to the client computing device; and
   un-register the tenant application manager at the resource manager.

9. The system of claim 1, the instructions further causing the memory controller processing circuitry to instruct a node manager to execute the computing job request at the dominant resource.

10. The system of claim 1, the instructions further causing the memory controller processing circuitry to:
    receive a status monitoring request at the resource manager; and
    provide a status monitoring update to the client computing device.

11. A method for managing dominant resources for multi-tenant applications within an edge/cloud computing environment, the method comprising:
    receiving a computing job request from a client computing device at a resource manager, the computing job request including a dominant resource request for a dominant resource and a non-dominant resource request for a non-dominant resource, the dominant resource including a first computing resource whose specifications constrain an execution of the computing job request;
    determining a proportional allocation of the non-dominant resource request and the dominant resource request;
    allocating, based on the proportional allocation, the non-dominant resource request to the non-dominant resource and the dominant resource request to the dominant resource;
    causing the execution of the computing job request at the non-dominant resource and the dominant resource;
    receiving a resource telemetry generated during execution of the computing job request, the resource telemetry including a non-dominant resource usage telemetry generated at the non-dominant resource and a dominant resource usage telemetry generated at the dominant resource during execution of the computing job request;

determining, based on the resource telemetry, that the computing job request includes a non-dominant resource usage attack;

issuing a request to cause the computing job request to be halted based on the resource telemetry;

adding the client computing device to a client device blocklist; and preventing a subsequent client job request from the client computing device.

12. The method of claim 11, further including:

generating a resource usage ratio profile based on the non-dominant resource usage telemetry and the dominant resource usage telemetry;

determining the resource usage ratio profile transgresses a resource usage ratio threshold; and causing the computing job request to be halted responsive to the resource usage ratio profile transgressing the resource usage ratio threshold.

13. The method of claim 12, further including:

adding the computing job request to a computing request watchlist;

receiving a subsequent computing request;

determining the subsequent computing request is consistent with the computing job request; and preventing the subsequent computing request from being executed.

14. The method of claim 11, further including verifying a dominant resource availability at an admission controller within the resource manager, wherein allocating the dominant resource is responsive to verifying the dominant resource availability.

15. The method of claim 14, further including:

issue a request to cause a tenant application manager to manage a resource container, the resource container including the non-dominant resource; and registering the tenant application manager at the resource manager;

wherein allocating the non-dominant resource request is further based on a negotiation for the non-dominant resource between the tenant application manager and the resource manager.

16. The method of claim 15, further including:

determining the computing job request has been completed;

providing an application result to the client computing device; and un-registering the tenant application manager at the resource manager.

17. The method of claim 11, further including instructing a node manager to execute the computing job request at the dominant resource.

18. The method of claim 11, further including:

receiving a status monitoring request at the resource manager; and providing a status monitoring update to the client computing device.

19. At least one non-transitory machine-readable storage medium, comprising a plurality of instructions that, responsive to being executed with processing circuitry of a computer-controlled device, cause the processing circuitry to:

receive a computing job request from a client computing device at a resource manager, the computing job request including a dominant resource request for a dominant resource and a non-dominant resource request for a non-dominant resource, the dominant resource including a first computing resource whose specifications constrain an execution of the computing job request;

determine a proportional allocation of the non-dominant resource request and the dominant resource request;

allocate, based on the proportional allocation, the non-dominant resource request to the non-dominant resource and the dominant resource request to the dominant resource;

issue a request to cause the execution of the computing job request at the non-dominant resource and the dominant resource;

receive a resource telemetry generated during execution of the computing job request, the resource telemetry including a non-dominant resource usage telemetry generated at the non-dominant resource and a dominant resource usage telemetry generated at the dominant resource during execution of the computing job request;

determine, based on the resource telemetry, that the computing job request includes a non-dominant resource usage attack;

issue a request to cause the computing job request to be halted based on the resource telemetry;

add the client computing device to a client device blocklist; and prevent a subsequent client job request from the client computing device.

20. The at least one non-transitory machine-readable storage medium of claim 19, the plurality of instructions further causing the processing circuitry to:

generate a resource usage ratio profile based on the non-dominant resource usage telemetry and the dominant resource usage telemetry;

determine the resource usage ratio profile transgresses a resource usage ratio threshold; and issue a request to cause the computing job request to be halted responsive to the resource usage ratio profile transgressing the resource usage ratio threshold.

21. The at least one non-transitory machine-readable storage medium of claim 20, the plurality of instructions further causing the processing circuitry to:

add the computing job request to a computing request watchlist;

receive a subsequent computing request;

determine the subsequent computing request is consistent with the computing job request; and issue a request to prevent the subsequent computing request from being executed.

22. The at least one non-transitory machine-readable storage medium of claim 19, the plurality of instructions further causing the processing circuitry to verify a dominant resource availability at an admission controller within the resource manager, wherein allocating the dominant resource is responsive to verifying the dominant resource availability.

* * * * *